(12) United States Patent (10) Patent No.: US 8,705,970 B2
Gottwald et al. (45) Date of Patent: Apr. 22, 2014

(54) METHOD FOR DATA PROCESSING IN AN OPTICAL NETWORK, OPTICAL NETWORK COMPONENT AND COMMUNICATION SYSTEM

(75) Inventors: Erich Gottwald, Holzkirchen (DE); Karl Kloppe, München (DE); Harald Rohde, München (DE)

(73) Assignee: Xieon Networks S.a.r.l., Luxemburg (LU)

( * ) Notice: Subject to any disclaimer, the term of this patent is extended or adjusted under 35 U.S.C. 154(b) by 320 days.

(21) Appl. No.: 13/056,668

(22) PCT Filed: Jul. 31, 2008

(86) PCT No.: PCT/EP2008/060082
§ 371 (c)(1),
(2), (4) Date: Mar. 28, 2011

(87) PCT Pub. No.: WO2010/012308
PCT Pub. Date: Feb. 4, 2010

(65) Prior Publication Data
US 2011/0206376 A1 Aug. 25, 2011

(51) Int. Cl.
*H04J 14/00* (2006.01)
(52) U.S. Cl.
USPC ............... 398/72; 398/76; 398/100; 398/202; 398/205; 398/183; 398/188; 398/115; 398/186; 398/79

(58) Field of Classification Search
USPC ......... 398/183, 184, 185, 186, 187, 188, 192, 398/193, 194, 195, 196, 197, 198, 200, 201, 398/79, 158, 159, 85, 87, 91, 66, 68, 69, 70, 398/71, 72, 76, 98, 99, 100, 115, 204, 205, 398/206, 207, 208, 209, 214, 202
See application file for complete search history.

(56) References Cited

U.S. PATENT DOCUMENTS

2006/0269295 A1* 11/2006 Way ............................. 398/183
2006/0291868 A1* 12/2006 Yee et al. ...................... 398/152

OTHER PUBLICATIONS

Presi et al: "A full-duplex symmetric WDM-PON featuring OSSB downlink modulation with optical down-conversion" OFC/NFOEC 2008. 2008 Optical Fiber Communication Conference / National Fiber Optic Engineers Conference, San Diego, CA, USA, Feb. 24-28, 2008 XP002525444 IEEE; Piscaraway, NJ, USA.

* cited by examiner

*Primary Examiner* — Hanh Phan
(74) *Attorney, Agent, or Firm* — Nelson Mullins Riley & Scarborough LLP

(57) ABSTRACT

A method for data processing in an optical network includes providing at least one main wavelength and processing a subcarrier modulation for the at least one main wavelength, wherein a portion of the subcarrier modulated signal is suppressed. An optical network component and a communication system having such an optical network component are also provided.

20 Claims, 9 Drawing Sheets

METHOD FOR DATA PROCESSING IN AN OPTICAL NETWORK, OPTICAL NETWORK COMPONENT AND COMMUNICATION SYSTEM

BACKGROUND OF THE INVENTION

1. Field of the Invention

The invention relates to a method for data processing in an optical network, to an optical network component and to a communication system comprising such optical network component.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

The PON has been standardized for FTTH solutions and it is currently being deployed by network service providers world-wide. Conventional PONs distribute downstream traffic from the optical line terminal (OLT) to optical network units (ONUS) in a broadcast manner while the ONUS send upstream data packets multiplexed in time to the OLT. Hence, communication among the ONUS needs to be conveyed through the OLT involving electronic processing such as buffering and/or scheduling, which results in latency and degrades the throughput of the network.

Upstream signals can be combined using a multiple access protocol, i.e. invariably time division multiple access (TDMA). The OLTs "range" the ONUS to provide time slot assignments for upstream communication. Hence, the data rate is distributed among several subscribers, whereas the single ONU needs to be capable of handling data rates that are significantly higher than the average data rate utilized by such ONU.

Future traffic is assessed to amount to ca. 1 Gb/s per subscriber regarding the majority of subscribers. A small portion of subscribers (compared to the number of total subscribers) will be provided with a data rate in the range of ca. 10 Gb/s. It would be very cost-ineffective and a plain waste of resources to equip all subscribers with ONUs that are capable of processing high data rates of, e.g., 10 Gb/s, wherein only a small portion of subscribers will actually receive such high data rates.

2. Brief Summary of the Invention

The problem to be solved is to overcome the disadvantages stated above and in particular to provide a flexible and cost effective optical network, e.g., a passive optical network or an optical access network.

This problem is solved according to the features of the independent claims. Further embodiments result from the depending claims.

In order to overcome this problem, a method for data processing in an optical network is provided comprising the steps (a) providing at least one main wavelength;
(b) processing a subcarrier modulation for said at least one main wavelength, wherein a portion of the subcarrier modulated signal is suppressed.

Suppressing a portion, e.g., a side band of the subcarrier modulated signal allows to efficiently utilize the optical power and to economically supply a huge number of subscribers.

It is noted that the approach provides for coherent data transmission in a point-to-point or point-to-multipoint optical network.

The optical network may comprise various structures, e.g., a ring or a bus topology or mixtures thereof.

According to an embodiment, the at least one main wavelength is an optical carrier that is in particular provided by at least one optical comb generator and/or by several light sources, in particular by several lasers.

In particular, several optical comb generators can be used to provide interleaving main wavelengths, wherein each such wavelength can be further utilized for subcarrier modulation.

In another embodiment, the subcarrier modulation comprises an optical and/or an electrical modulation.

Hence, subcarrier modulation can be done either optically and/or electronically. For example, a set of subcarriers can be generated by optical modulation of a main wavelength.

It is noted that various types of modulation may be applicable, e.g., OOK, QAM, QPSK, etc.

Integrated modulators can be used in particular deployed as an array structure to combine the user data with the subcarriers.

In a further embodiment, in step (b) the subcarrier modulation suppressing a portion of the modulated signal comprises substantially a single sideband modulation.

Hence, via single sideband modulation a portion of said subcarrier modulated signal is suppressed.

In a next embodiment, in step (b) an optical filtering is performed in order to suppress a portion of the subcarrier modulated signal, in particular in order to suppress substantially at least a portion of the side band.

Thus, as an alternative, filtering may apply in order to suppress said portion of the subcarrier modulated signal. Such can be achieved, e.g., by means of an optical filter.

As another alternative, electronic filtering may apply. Advantageously, optical and electronic filtering may be combined in order to suppress said portion of the subcarrier signal.

It is also an embodiment that the main wavelength is suppressed, in particular by means of destructive interference.

This can be achieved by feeding the main wavelength to a modulator and to a 180° phase shifter and combining the outputs of such modulator and the phase shifter thereinafter. This allows to obtain the modulated signal without the main wavelength.

In an embodiment, subcarriers for said subcarrier modulation are provided optically and/or electronically in particular based on each said at least one main wavelength.

Preferably, an array of modulators can be utilized in order to process the at least one main wavelength and to provide the modulated signal(s).

Advantageously, each subcarrier may carry user data and is supplied to at least one subscriber.

Pursuant to another embodiment, the at least one subcarrier or a set of subcarriers is assigned to one subscriber or to several subscribers.

Hence, one subscriber may sign up for a higher bandwidth thereby being provided with several subcarriers to convey user data. As an alternative, the spacing between subcarriers may vary in order to allow higher bandwidth to be conveyed to the subscriber.

This concept advantageously applies in downstream direction as well as in upstream direction.

Preferably, in downstream direction, an optical line terminal (OLT) supplies several optical network units (ONUs), wherein in upstream direction traffic is conveyed from the ONUS towards the OLT.

It is possible to convey upstream traffic from several ONUS via overlapping or same wavelengths, but modulated at each ONU on different disjoint sub-carrier frequencies.

It is noted that one light source provided, e.g., by the optical comb generator or by an individual laser, is utilized as optical local oscillator for a set of ONUS.

According to an embodiment, different subcarriers are utilized for upstream and downstream data.

In particular, different subcarriers or sets of subcarriers can be assigned to different receiving units and/or to different transmitting units (at the OLT as well as at the ONU). This advantageously allows using the subcarriers in a flexible way to meet the subscriber's demand for bandwidth and to provide an effective and non-expensive optical network.

It is in particular of advantage to use disjoint subcarriers or disjoint sets of subcarriers in upstream and downstream direction.

It is noted that a transmitter at the ONU may be realized as a reflective transmitter.

According to another embodiment, the at least one main wavelength is provided by a local oscillator. The main wavelength provided by the local oscillator can further be utilized for receiving and transmitting purposes.

Hence, in particular at the ONU, the local oscillator signal can be used for receiving as well as transmitting purposes.

The problem stated supra is solved by an optical network component
(a) arranged to provide at least one main wavelength;
(b) arranged to process a subcarrier modulation for said at least one main wavelength, wherein a portion of the subcarrier modulated signal is suppressed.

As an embodiment, the at least one main wavelength is an optical carrier that is in particular provided by at least one optical comb generator and/or by several light sources, in particular by several lasers.

The problem stated above is also solved by an optical network component comprising a and/or being associated with a processor unit and/or a hard-wired circuit and/or a logic device and/or optical components that is arranged such that the method as described herein.

According to an embodiment, the optical network component is a or is associated with an optical line terminal and/or an optical network unit.

The optical network component may be or it may be associated with a coherent receiver comprising
 means for electrical down-conversion to baseband of the signal received; and
 means for detecting data symbols in particular via analog-to-digital conversion followed by digital processing.

A coherent receiver may also be arranged to separate subcarriers by electrical filtering and to detect data symbols via analog-to-digital conversion followed by digital processing.

The problem stated supra is further solved by a communication system, in particular a PON, comprising the optical network component as described herein.

It is an embodiment that at least one optical network unit is supplied by a signal from an local oscillator, said local oscillator being deployed external or internal to the optical network unit.

It is noted that said optical network may comprise or be an optical access network (OAN) that is in particular based on a tree topology and comprises at least one passive optical splitter and utilizes the transmission and/or receiving concept as described herein. Said OAN may comprise (coarse) WDM multiplexer, passive optical splitters, (bi-directional) optical amplifiers.

Embodiments of the invention are shown and illustrated in the following figures:

DESCRIPTION OF THE INVENTION

Figure 1:
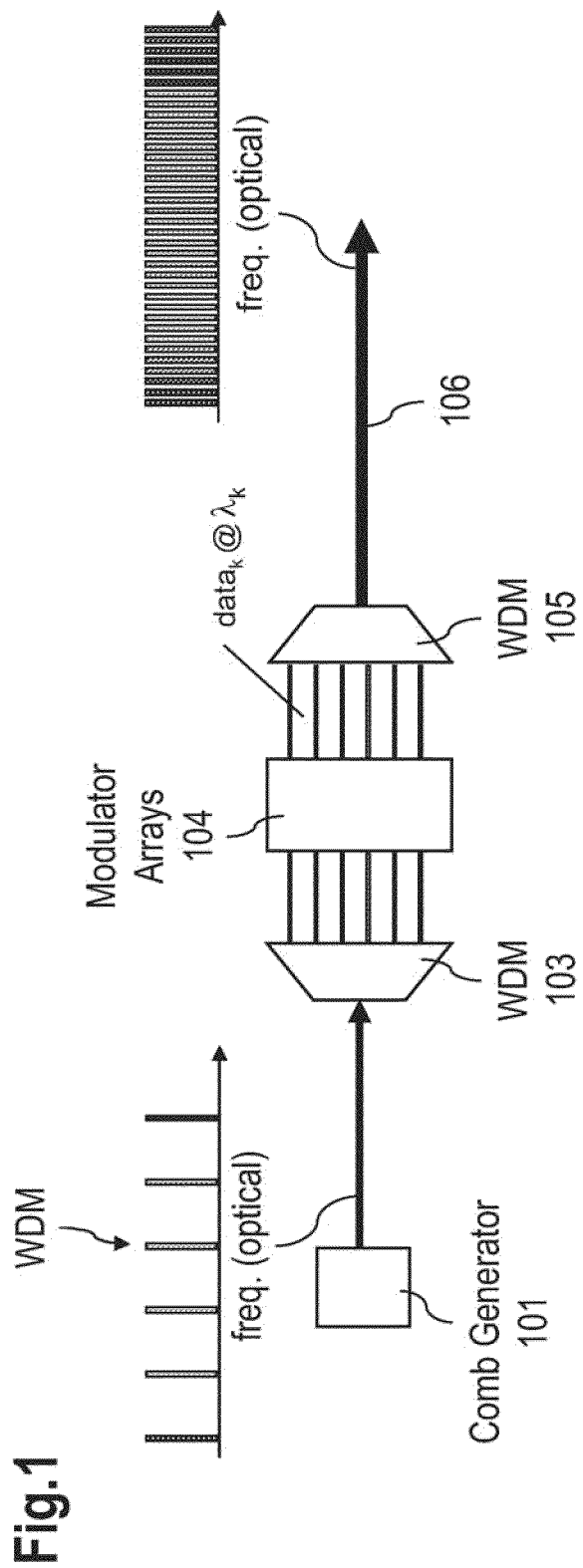
FIG. 1 shows an optical comb generator providing several main wavelengths to a wavelength division multiplexer WDM which further feeds the wavelengths to a modulator array.

The approach provided allows establishing an ultra-dense WDM (UDWDM) based optical access network (OAN) on a splitter-based structure enabling dynamic bandwidth allocation without any need for thousands of stabilized laser sources and without expensive optical UDWDM components.

This objective is met in particular by utilizing optical and/or electrical single-side-band RX/TX concepts based on coherent transmission and on subcarrier modulation.

UDWDM can be used in combination with coherent receivers and common optical local oscillators and transmitter lasers for at least one ONU, in particular for a subset of ONUS. All modulation formats in particular suitable for coherent detection can be utilized. In particular, on-off-keying (OOK) and quadrature amplitude modulation (QAM) can be combined with orthogonal frequency division multiplexing (OFDM) for modulation purposes.

UDWDM could provide channel spacing in the order of 1 GHz to 10 GHz. To each user a wavelength or a set of wavelengths can be assigned in particular without any sharing capacity and/or without time division multiplex (TDM).

Data rates per subscriber may amount from about 1 Gb/s for a standard subscriber to about 10 Gb/s or even more for subscribers with enhanced demand for transmission capacity. The spacing of the wavelength channels reflects this demand of bandwidth. Alternatively, a set of wavelengths is allocated to meet the enhanced capacity requirement and/or a higher order modulation format can be used as in wireless communications (see, e.g., EDGE).

The channel separation at the receiver can be done based on the frequency (wavelength) of the optical local oscillator combined with electrical low pass filtering. Electrical filtering with a tunable band pass allows using shared local optical oscillators for several receivers, in particular for a subset of receivers. Sharing the local optical oscillator reduces system costs. In practical applications, sharing up to a factor of about 10 or more is feasible without any need for fast electrical processing (and thus expensive components).

A receiver comprising a set of n electrical band pass filters can handle a total data rate per subscriber increased by a factor of n compared to data rate provided by a single wavelength.

At the OLT, at least one generator for providing optical frequency combs ("optical comb generator") may be used instead of thousands of separate lasers. Optical comb generators with a span of 1 THz are known.

The number of optical light sources and electro-optical converters (modulators) can be reduced by utilizing optical single side band modulation in combination with electrical subcarriers.

Using sets of interleaved optical frequency comb generators enables separating and modulating optical carriers individually. For example, 25 times 25 GHz frequency combs interleaved with 1 GHz spacing or 10 times 25 GHz with 2.5 GHz spacing can be processed.

The approach provided further allows using the same lasers as optical local oscillators and as transmitting light sources. Thus, upstream and downstream signals can be separated by the electrical subcarrier, e.g., downstream can be assigned to odd numbers like 1, 3, 5, 7, . . . GHz subcarrier frequencies and upstream signals can be assigned to even numbers like 2, 4, 6, 8, . . . GHz subcarrier frequencies. Alternatively, downstream signals may utilize higher frequencies and upstream signals may utilize lower frequencies to save costs for modulation at the ONU.

It is further possible to provide and utilize single sideband modulation in the electrical domain. Together with optical single side band modulation, the spectral efficiency is enhanced by a factor of about four compared to double side band signals in the electrical and in the optical domains.

Another alternative is based on optical dual sideband modulation providing advantages regarding complexity of implementation. The subcarriers may then be electrically modulated either via single sideband or via dual sideband modulation.

The approach provided bears in particular the following advantages:
1) There is no need for active components like lambda-agile switches at the local exchange.
2) No tunable narrow band optical filters are required at the ONU.
3) No burst mode and time slot management is needed.
4) Channel separation can be provided by electrical filtering and coherent detection.
5) Wavelength channels can be easily bundled in order to increase data rates for high value subscribers.
6) The coherent detection works at a very low optical power level.
7) The network itself can be purely passive without any optical inline amplifiers.
8) There is no need for expensive optical DWDM components (DEMUX, Filter).
9) The reduced data rate per wavelength allows digital processing with state of the art technology (e.g., OFDM), which in particular allows significantly reducing the costs for the ONUs.
10) Wavelength bands can be re-configured or upgraded without any need for changing existing infrastructure.
11) The OAN is compatible with today's GPON infrastructure.
12) Flexible modulation techniques or formats enable individual data rates for "normal" subscribers as well as for "high value" subscribers.

Transmitter/Receiver Implementations

It is noted that advantageously receivers comprise polarization diversity based coherent receivers, which is in particular heterodyne, "pseudo"-homodyne or intradyne (an intermediate frequency is close to zero, there may be no optical phase synchronization between received light and local oscillator; the synchronization may be processed within the electrical domain.)

Transmitter at the OLT

FIG. 1 shows an optical comb generator 101 providing several main wavelengths 102 to a wavelength division multiplexer WDM 103, which further feeds the wavelengths 102 to a modulator array 104. Each modulator of the modulator array 104 generates via a single sideband modulation several 1 GHz data streams that are combined by a wavelength division multiplexer WDM 105 to an optical signal 106.

The output of the modulators 104 comprises electrical subcarriers and electrical single side band information that may be created by analog and/or by digital means or a combination of both.

Figure 2:
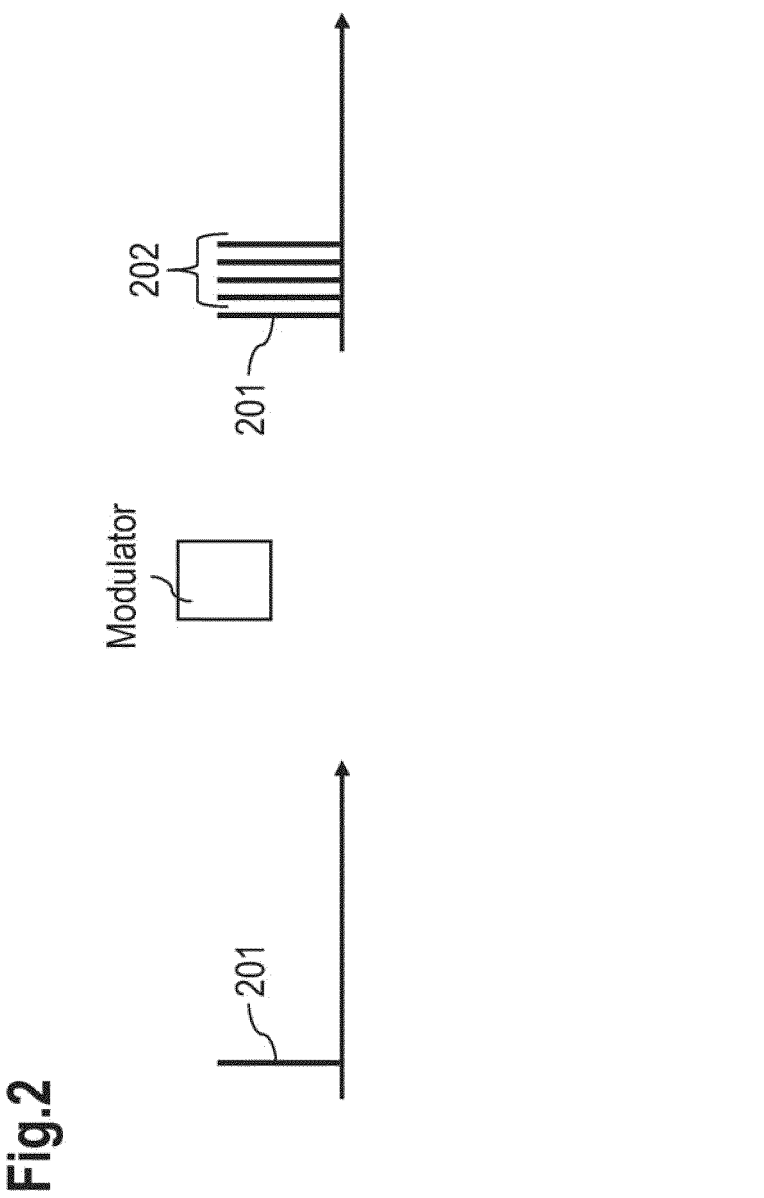
FIG. 2 shows a main wavelength that may be generated by an optical local oscillator, wherein this main wavelength is processed to a set of wavelength comprising the main wavelength and additional wavelengths.

FIG. 2 shows a main wavelength 201 that may be generated by an optical local oscillator. This main wavelength 201 is processed to a set of wavelength comprising the main wavelength 201 and additional wavelengths 202. The additional wavelengths 202 are preferably single side band wavelengths. As an option, the main carrier 201 can be suppressed by either optical or electrical means or both.

Receiver at the OLT

Figure 3:
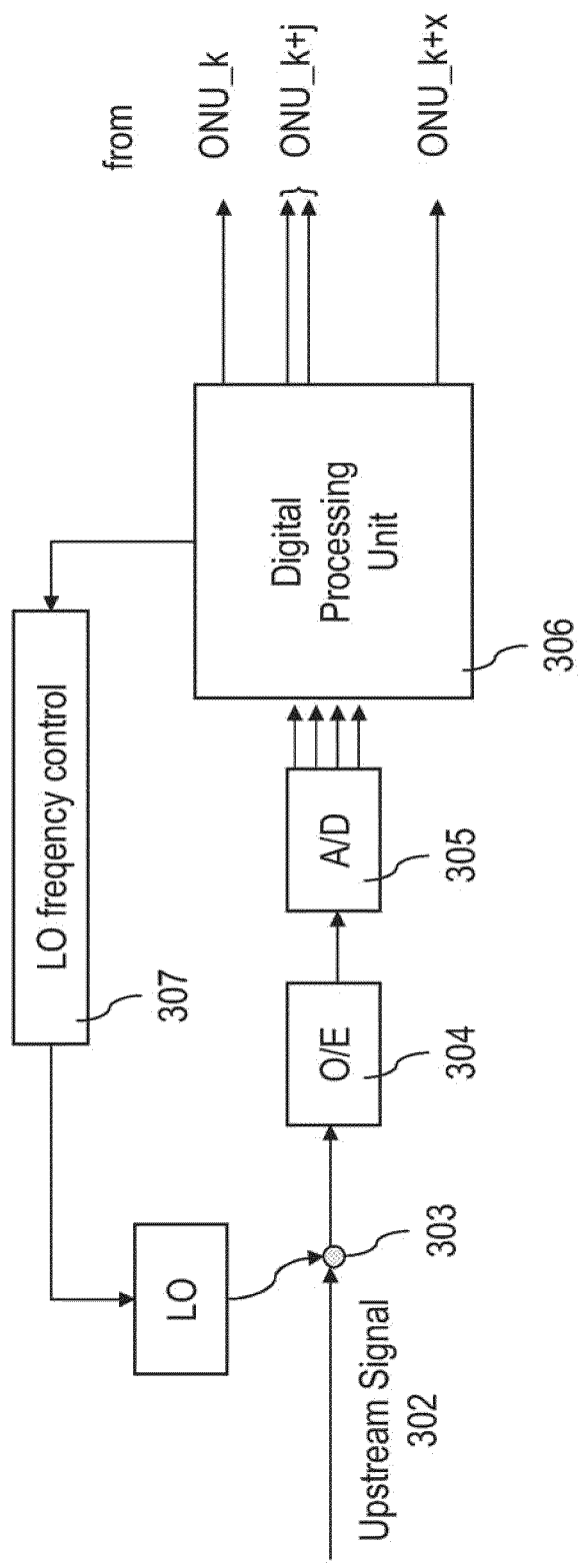
FIG. 3 shows an exemplary receiver structure at the OLT.

FIG. 3 shows an exemplary receiver structure at the OLT. At such a coherent receiver, one local oscillator 301 is utilized for a set of adjacent wavelengths (optical channels).

An upstream signal 301 is conveyed together with the output from the local oscillator 301 to a combiner 303 and is further fed to an optical/electrical (O/E) converter 304. The analog electric signal provided at the output of the optical/electrical converter 304 is converted to a digital signal by an A/D converter 305 and the digital signal is further conveyed to a digital processing unit 306.

The digital processing unit 306 provides an electrical signal conveyed to a LO frequency control 307 which sets the frequency of the local oscillator 301.

The digital processing unit 306 further provides digital signals from different ONUS as an output.

In the electrical domain, each optical channel generates a data signal on an electrical carrier with a frequency substantially equal to the frequency difference between the frequency of the optical local oscillator and the frequency of the optical channel.

Separation, down-conversion to baseband and detection of the data signal and/or symbols of the channels in the electrical domain may be provided by electrical band pass filtering and manipulation or by analog to digital conversion followed by digital processing like FFT, etc.

Depending on bandwidth allocation, each of the digital data streams or each set of digital data streams is assigned to at least one corresponding ONU.

Receiver at the ONU

The receiver at the ONU is basically similar to the receiver at the OLT. One difference is that the ONU may only process at least one subcarrier or a set of subcarriers that is/are assigned to this particular ONU. It is another difference to the OLT receiver that an optical local oscillator may be deployed with each ONU or it may be provided for a set of ONUS.

Transmitter at the ONU

Figure 4:
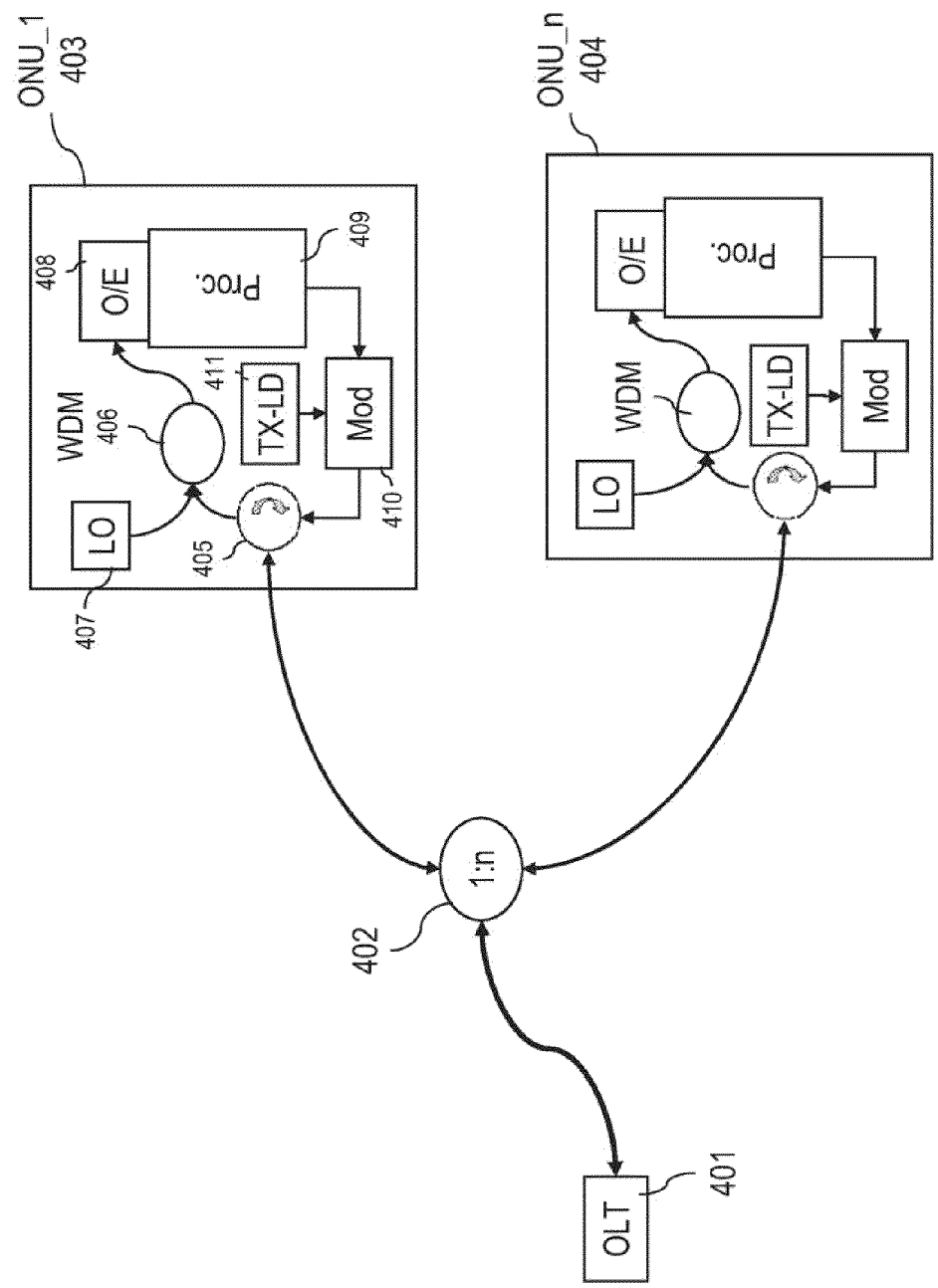
FIG. 4 depicts an receiver/transmitter concept at the ONU comprising a local oscillator and a transmitter being deployed at each ONU.
Figure 5:
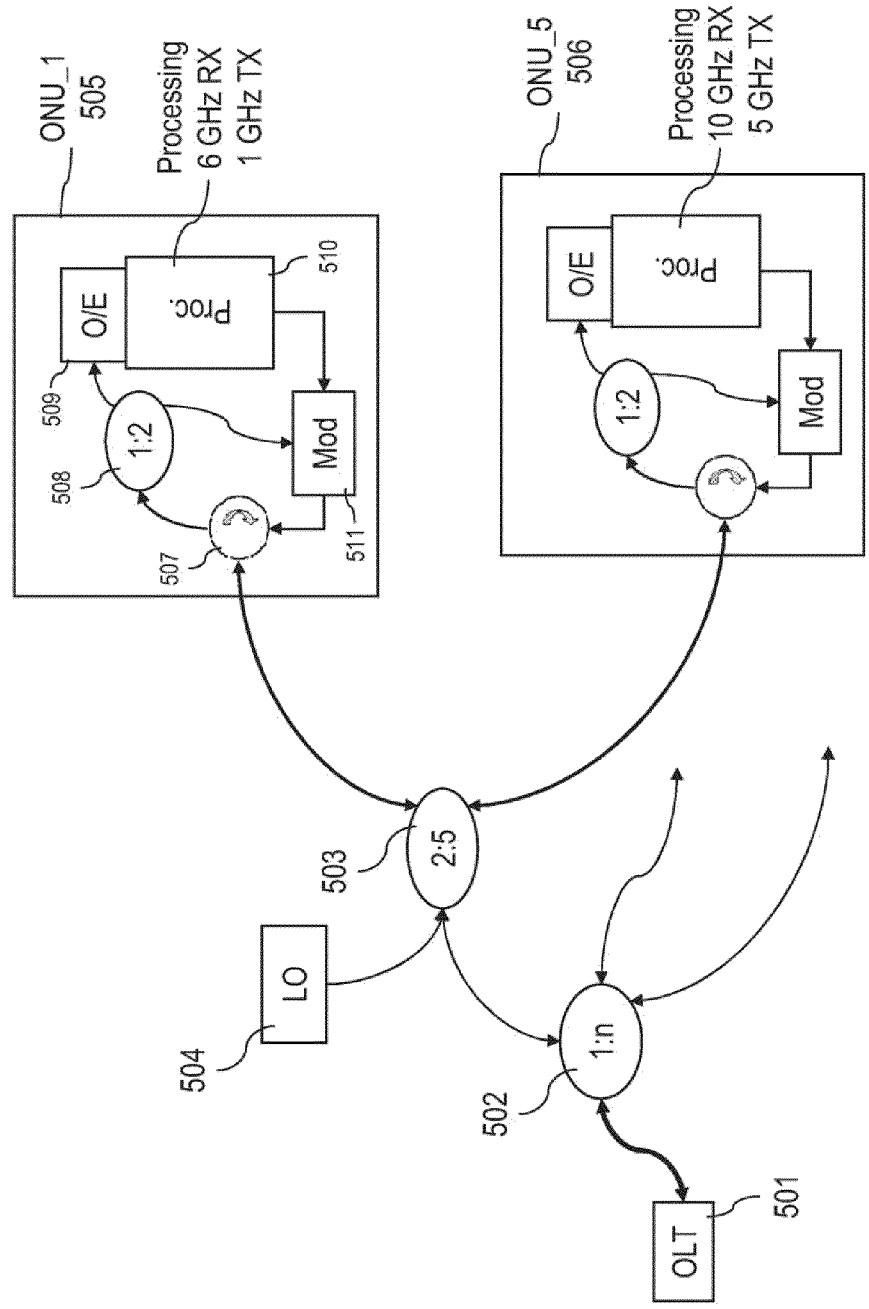
FIG. 5 shows an efficient concept comprising a shared local oscillator that is utilized as transmitter laser for the ONUS.

Two examples as how to implement an ONU are shown in FIG. 4 and in FIG. 5.

FIG. 4 depicts an receiver/transmitter concept at the ONU comprising a local oscillator and a transmitter being deployed at each ONU.

An OLT 401 is connected to a 1:n splitter 402 which is further connected to n ONUS. In FIG. 4 two ONUS ONU_1 403 and ONU_n 404 are shown. The ONUS preferably comprise a similar structure. Hereinafter, the structure of ONU_1 403 is described.

ONU_1 403 is connected to the splitter 402 via a circulator 405 being used for receiving and for transmitting purposes. The receiving path is fed from the circulator 405 to a wave division multiplexer WDM 406. The signal from a local oscillator 407 is also conveyed to the input of the wave division multiplexer 406. The output of the wave division multiplexer WDM 406 is conveyed to an O/E converter 408 and further processed by a processing unit 409. Said processing unit 409 provides upstream and downstream signal, i.e. processes downstream signals provided by the OLT 401 and arranges upstream signals to be conveyed to said OLT 401.

The upstream signal is fed to a modulator 410 where it is modulated with an optical carrier provided by a laser diode TX LD 411, the output of said modulator 410 being connected to said circulator 405.

It is noted that for upstream data signals a particular wavelength band, e.g., the C-band-red and for downstream data signals a different wavelength band, e.g., the C-band-blue, can be used. Hence, the local oscillator 407 provides a C-band-red frequency and the laser diode TX LD provides a C-band-blue frequency.

FIG. 5 shows an efficient concept comprising a shared local oscillator that is utilized as transmitter laser for the ONUS. Upstream and downstream as well as ONU separation is achieved by assigning specific electrical subcarriers.

An OLT 501 is connected to a 1:n splitter 502, one output of which is connected to a 2:5 splitter 503. A signal from a local oscillator 504 is also fed to said 2:5 splitter. In FIG. 5 two ONUS ONU_1 505 and ONU_5 506 are shown. The ONUS preferably comprise a similar structure. Hereinafter, the structure of ONU_1 505 is described.

ONU_1 505 is connected to the splitter 503 via a circulator 507 being used for receiving and for transmitting purposes. The receiving path is fed from the circulator 507 to a 1:2 splitter 508, which first output is conveyed to an O/E converter 509 and to a modulator MOD 511. The O/E converter 509 is further connected to a processing unit 510 processing upstream and downstream signals.

For example, subcarriers 1, 2, 3, 4 and 5 GHz are used for upstream data and subcarriers 6, 7, 8, 9 and 10 GHz are used for downstream data. Utilizing lower frequencies for upstream data further reduces the costs of the ONU.

As an example, ONU_1 505 in FIG. 5 may utilize 6 GHz bandwidth for downstream and 1 GHz bandwidth for upstream, whereas ONU_5 506 may utilize 10 GHz for downstream and 5 GHz for upstream.

The bandwidths utilized in each ONU can be configured centrally, e.g., via OAM messages. Advantageously, parameters at each ONU can be remotely accessed and set according to the subscriber's demands. This allows flexible and easy administration at low cost, because no hardware has to be changed and no changes have to be (manually) done on each customer's premises.

The output of the processing unit 510 is fed to the modulator MOD 511 which is provided with the optical carrier by said splitter 508. The output of modulator MOD 511 is conveyed to the circulator 507 and further transmitted towards the OLT 501.

It is noted that the optical power level of the local oscillator 407 is several orders of magnitude higher than the received signal. This enables splitting the incoming data signal and the local oscillator signal for reception purposes (decoding the information received) as well as optical source (oscillator signal) for modulating the signal to be transmitted back to the OLT.

It is noted that the transmitters can be realized as reflective transmitters.

Figure 6:
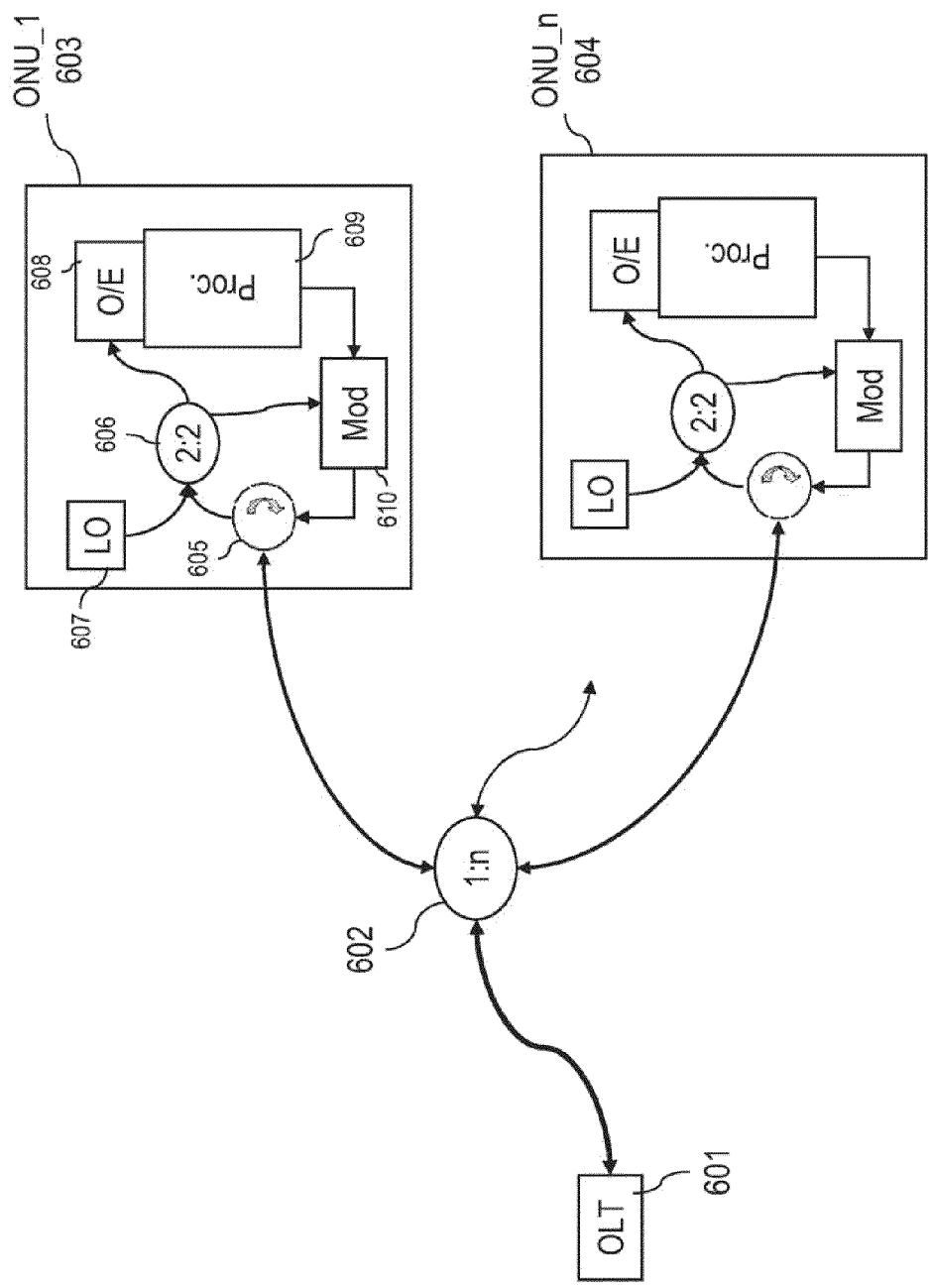
FIG. 6 shows a receiver/transmitter concept at the ONU based on FIG. 4, wherein the local oscillator is utilized as transmission laser.

FIG. 6 shows a receiver/transmitter concept at the ONU based on FIG. 4, wherein the local oscillator is utilized as transmission laser.

An OLT 601 is connected to a 1:n splitter 602 which is further connected to n ONUS. In FIG. 6 two ONUS ONU_1 603 and ONU_n 604 are shown. The ONUS preferably comprise a similar structure. Hereinafter, the structure of ONU_1 603 is described.

ONU_1 603 is connected to the splitter 602 via a circulator 605 being used for receiving and for transmitting purposes. The receiving path is fed from the circulator 605 to a 2:2 splitter 606. The signal from a local oscillator 607 is also conveyed to the input of the 2:2 splitter 606. One output of the 2:2 splitter 606 is conveyed to an O/E converter 608 where it is further processed by a processing unit 609. The other output of said 2:2 splitter 606 is fed to a Modulator MOD 610.

Said processing unit 609 provides upstream and downstream signal, i.e. processes downstream signals provided by the OLT 601 and arranges upstream signals to be conveyed to said OLT 601.

The upstream signal is fed to the modulator MOD 610 where it is modulated with an optical carrier that is provided by said 2:2 splitter 606. The output of said modulator 610 being connected to said circulator 605.

FURTHER EXAMPLES AND OPTIONS

Figure 7:
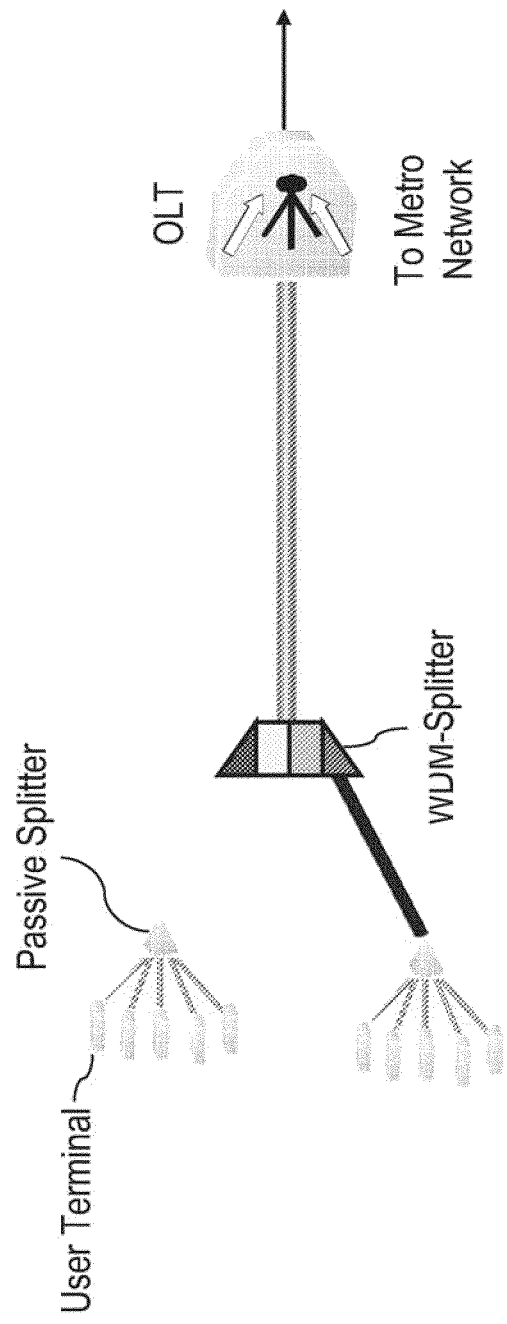
FIG. 7 shows an architectural option of a transmitter/receiver concept without additional amplification stage.

FIG. 7 shows an architectural option of a transmitter/receiver concept without additional amplification stage. An OLT is connected to a WDM splitter that splits four sets of bandwidths each to a passive splitter. Each passive splitter is further connected to several user terminals.

Figure 8:
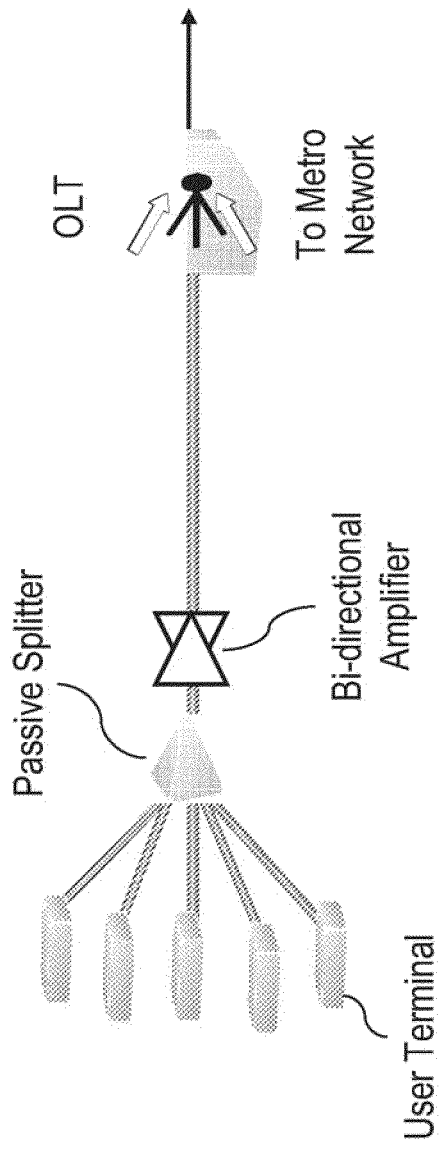
FIG. 8 shows an architectural option of a transmitter/receiver concept with a bi-directional amplifier deployed between an OLT and a passive splitter.

FIG. 8 shows an architectural option of a transmitter/receiver concept with a bi-directional amplifier deployed between an OLT and a passive splitter, wherein the passive splitter is further connected to several user terminals.

Figure 9:
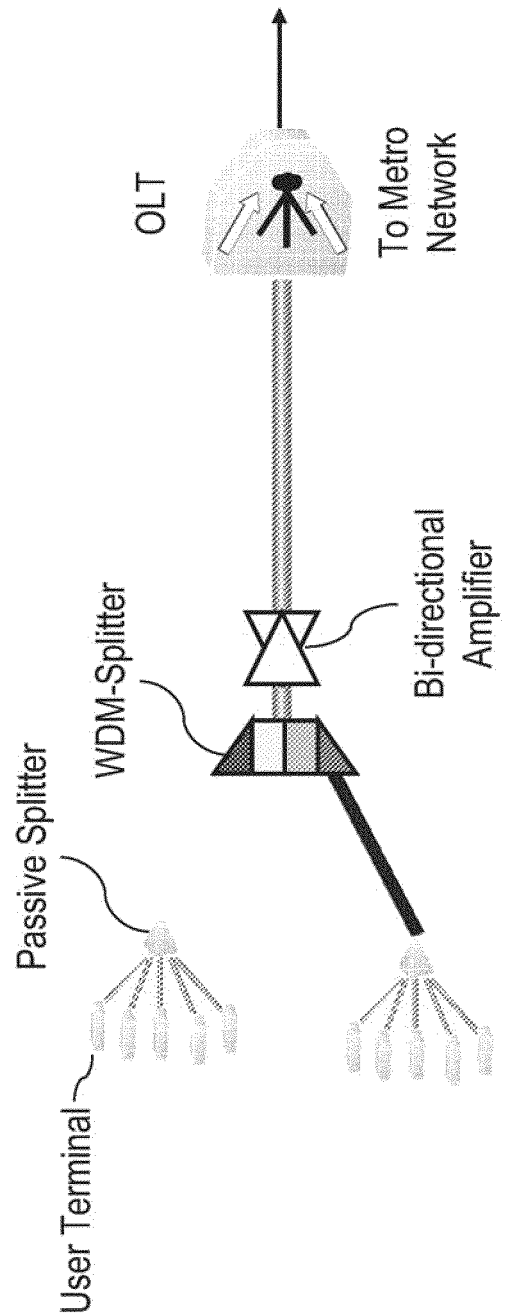
FIG. 9 shows an architectural option based on the structure of FIG. 7, wherein a bi-directional amplifier is deployed between the WDM splitter and the OLT.

FIG. 9 shows an architectural option of a transmitter/receiver concept combining the approaches depicted in FIG. 7 and FIG. 8. Hence, based on the structure of FIG. 7, in FIG. 9 a bi-directional amplifier is deployed between the WDM splitter and the OLT.

It is a further option of the approach provided herein that the optical oscillator may be locked on one of the subcarriers instead of the optical main wavelength (main carrier).

Advantageously, the main wavelength can be suppressed. This would result in an 3 dB reduction of optical power without any loss of information or signal performance. The main wavelength would otherwise carry about 50% of the total optical power, wherein such main wavelength is not required at the receiver (ONU) because of its (local or common) oscillator. In upstream direction, such main wavelength is advantageously to be suppressed in order to avoid interference with other upstream data provided by various ONUs using the same main wavelength which—due to cable differences and varying transmitting distances—would be received at the OLT not as one main wavelength but as several similar wavelength interfering with each other thereby deteriorating the signal.

LIST OF ABBREVIATIONS

A/D Analog-to-Digital
CWDM Coarse WDM
LO (optical) Local Oscillator
OAN Optical Access Network
OFDM Orthogonal Frequency Division Multiplexing
OLT Optical Line Terminal ONU Optical Network Unit
OOK On-Off-Keying
QAM Quadrature Amplitude Modulation
O/E Optical-to-Electrical
PON Passive Optical Network
TDM Time Division Multiplex
UDWDM Ultra Dense WDM
WDM Wavelength Division Multiplex(er)

The invention claimed is:

1. A method for data transmission in an optical network between an optical line terminal and a plurality of optical network units, the method comprising the following steps:
    (a) providing at least one main wavelength;
    (b) processing a subcarrier modulation for the at least one main wavelength, suppressing a portion of a subcarrier modulated signal;
    wherein the method further comprises at least one of optically or electronically providing subcarriers for the subcarrier modulation, and assigning at least one subcarrier or a set of subcarriers to each optical network unit, thereby providing point-to-point connections between said optical line terminal and said plurality of optical network units;
    (c) providing individual data rates for said point-to-point connections to said plurality of optical network units; and
    (d) applying coherent detection of received signals.

2. The method according to claim 1, wherein the at least one main wavelength is an optical carrier.

3. The method according to claim 2, wherein the optical carrier is provided by at least one of at least one optical comb generator or several light sources.

4. The method according to claim 3, wherein the light sources are several lasers.

5. The method according to claim 1, wherein the subcarrier modulation includes at least one of an optical or an electrical modulation.

6. The method according to claim 1, wherein the subcarrier modulation suppressing a portion of the modulated signal in step (b) substantially includes a single sideband modulation.

7. The method according to claim 6, which further comprises performing an optical filtering in step (b) to suppress substantially at least a portion of the side band.

8. The method according to claim 1, which further comprises performing an optical filtering in step (b) to suppress a portion of the subcarrier modulated signal.

9. The method according to claim 1, which further comprises suppressing the main wavelength in step (b).

10. The method according to claim 1, which further comprises suppressing the main wavelength in step (b) by destructive interference.

11. The method according to claim 1, which further comprises at least one of optically or electronically providing subcarriers for the subcarrier modulation based on each said at least one main wavelength.

12. The method according to claim 1, which further comprises utilizing different subcarriers for upstream and downstream data.

13. The method according to claim 1, which further comprises providing the at least one main wavelength with a local oscillator.

14. The method according to claim 13, which further comprises utilizing the main wavelength provided by the local oscillator for receiving and transmitting.

15. An optical network for data transmission between an optical line terminal and a plurality of optical networks units, said optical network comprising:
    (a) means for providing at least one main wavelength;
    (b) means for processing a subcarrier modulation for said at least one main wavelength, suppressing a portion of a subcarrier modulated signal,
    wherein said optical network provides subcarriers for the subcarrier modulation at least one of optically or electronically, and assigns at least one subcarrier or a set of subcarriers to each optical network unit, thereby providing point-to-point connections between said optical line terminal and said plurality of optical network units;
    said optical network further comprising:
    (c) means for providing individual data rates for said point-to-point connections to said plurality of optical network units; and
    (d) means for applying coherent detection of received signals.

16. The optical network according to claim 15, wherein said at least one main wavelength is an optical carrier.

17. The optical network according to claim 16, wherein said optical carrier is provided by at least one of at least one optical comb generator or several light sources.

18. The optical network according to claim 16, wherein said several light sources are several lasers.

19. The optical network according to claim 15, which further comprises a local oscillator supplying a signal to at least one optical network unit, said local oscillator being deployed externally to or internally of said optical network unit.

20. An optical network component, comprising: a processor unit programmed for performing a method for data transmission in an optical network between an optical line terminal and a plurality of optical network units, the method comprising the following steps:
    (a) providing at least one main wavelength;
    (b) processing a subcarrier modulation for the at least one main wavelength, suppressing a portion of a subcarrier modulated signal;
    wherein the method further comprises at least one of optically or electronically providing subcarriers for the subcarrier modulation, and assigning at least one subcarrier or a set of subcarriers to each optical network unit, thereby providing point-to-point connections between said optical line terminal and said plurality of optical network units;
    (c) providing individual data rates for said point-to-point connections to said plurality of optical network units; and
    (d) applying coherent detection of received signals.

* * * * *